United States Patent [19]

Bennett

[11] Patent Number: 5,557,460

[45] Date of Patent: * Sep. 17, 1996

[54] TWO SIDED MARKER

[75] Inventor: Reginald S. Bennett, Ajax, Canada

[73] Assignee: Reginald Bennett International Inc., Ajax, Canada

[*] Notice: The term of this patent shall not extend beyond the expiration date of Pat. No. 5,416,636.

[21] Appl. No.: 402,499

[22] Filed: Mar. 13, 1995

Related U.S. Application Data

[63] Continuation-in-part of Ser. No. 6,966, Jan. 21, 1993, Pat. No. 5,416,636, and a continuation-in-part of Ser. No. 775,751, Oct. 15, 1991, Pat. No. 5,223,977, which is a continuation-in-part of Ser. No. 617,766, Nov. 26, 1990, Pat. No. 5,115,343.

[51] Int. Cl.$^6$ .................................................. G02B 5/122
[52] U.S. Cl. .......................... 359/530; 359/529; 340/947
[58] Field of Search .................................... 359/515, 527, 359/529–532, 546–547, 551–553; 404/14, 16, 9; 116/63 R, 63 P, 63 T, 63 C; 340/946–948, 952–953

[56] References Cited

U.S. PATENT DOCUMENTS 4,428,320  1/1984  Oplt et al. ........................ 404/14
4,726,706  2/1988  Attar ................................. 404/16
4,868,567  9/1989  Eichweber ....................... 340/947

Primary Examiner—James Phan

[57] ABSTRACT

The marker has a pair of upwardly converging reflectant planar panels facing approximately in opposite directions. In its correct attitude on a support surface the panels slope at 2°–6° to the vertical if the marker is intended for assisting the landing of fixed wing aircraft and at 8°–10° to the vertical if the marker is intended for assisting the landing of helicopters (Collectively at 2°–10° to the vertical). The reflectant panels are preferably retroreflectant. Preferably the opposed sloping panels converge when considered relative to intersecting horizontal planes (when the marker is properly levelled). This convergence may also be measured as the angle between vertical planes respectively perpendicular to the opposed panels. Such convergence in plan may preferably be 0°–6° for use with fixed wing aircraft but may be larger for fixed wing aircraft in certain conditions. Such convergence in plan is preferably 16°–20° in markers used with helicopters. Collectively for fixed wing aircraft and helicopters the convergence in plan may therefore be considered as 0°–20°.

13 Claims, 5 Drawing Sheets

TWO SIDED MARKER

This application is a continuation-in-part of application Ser. No. 08/006,966 filed in Jan. 21, 1993, now U.S. Pat. No. 5,416,636 a continuation-in-part of application Ser. No. 07/775,751 filed on Oct. 15, 1991, now U.S. Pat. No. 5,223,977, which in turn, is a continuous-in-part of application Ser. No. 07/617,766 filed on Nov. 26, 1990, now U.S. Pat. No. 5,115,343.

This invention relates to a marker for use in marking unlighted runways or helicopter landing pads in remote areas.

There is a considerable need for a cheap and efficient reflector marker for remote runways which may be located in areas without a practically available source of power. Such a cheap and efficient reflector marker may also be required as back up, for use on a normally lighted runway, in case of power failure. There is an analgous need for helicopter pad markers.

The invention provides an economical and efficient runway marker for fixed wing aircraft and helicopters, having means for mounting the marker on a support surface adjacent a runway in a predetermined attitude. The marker has a pair of substantially planar panels joined to face in approximately opposite directions. Each panel extends upwardly and slopes toward the other and slopes at an angle of about 4°–12° in a vertical plane to the other panel, for fixed wing aircraft, whereby the reflector may be mounted in said attitude with the panels each sloping at about 2°–6°, a substantial part-of each of said surfaces being retroreflectant. (For helicopters the panels will converge in a vertical plane at about 16°–20° and slope at about 8°–10° to the vertical when in the desired attitude.)

Thus considering markers for fixed-wing aircraft and for helicopters, collectively, the panels will slope inwardly toward each other at angles, in a vertical plane, of between 4° and 20° and, when correctly oriented each panel will slope at an angle of between 2° and 10° to the vertical.

By retroflection herein is meant reflection back toward the source of the incident ray.

There is thus provided a convenient runway marker which may be mounted on the support surface to provide retroflectant panels each at 2°–6° to the vertical to correspond to the preferred 3° descent angle for fixed wing aircraft, and with the normals to the substantially planar panel surfaces directed in a vertical plane parallel to the runway, so that a plane on a landing approach, with its landing lights or a spotlight on, will receive the brightest retroflection when descending in line with the runway and at 2°–6° descending approach path. Since reflectant surfaces of specific qualities are discussed hereafter, it is noted that an ordinary retroflectant surface will give (to the pilot) a higher retroreflection when the beam is incident normal to the reflecting surface, than when the beam's direction of incidence is non-normal. The support surface for the marker may be a specifically provided base, or a base provided for other purposes. Or ground levelling means may be provided to achieve the desired orientation for the retroreflecting surface.

The invention is described mainly with reference to the marker for fixed wing aircraft and their landing strips, where the retroreflecting panels slope at angles of between 2° and 6° to the vertical. However, it should be realized that the invention as disclosed throughout applies where the panels slope at between 8°–10° to ther vertical for use with helicopters and in combination with helicopter landing pads.

Thus the panels in accord with the invention may be thought of as sloping, at a angle to the vertical of between 2° and 10°.

In a preferred aspect of the invention, the reflectant area is covered with retroreflecting material which gives a brighter retroreflection for incident light normal to the plane of the reflection than its retroreflection for light incident at another angle. Thus retroreflecting material and normally reflecting material will give a higher degree of retroreflectivity to normally incident light but the relative drop in retroreflectivity, for non-normal angles of incident light, will be greater with ordinary reflective material than with retroreflective. Thus for aircraft approaching the marker from directions other than normal to a reflectant area, the marker with retroflectant material is easier for the pilot to detect.

With retroreflectant material, the pilot of an approaching aircraft receives, whatever his approach angle, a brighter reflection of his landing lights than with an ordinary reflector, and, because of a quality of the preferred retroreflector receives the brightest reflection when he is on the correct approach path. Thus the pilot may use the reflection intensity as his guide toward finding and following the correct path.

By the term "aluminum" herein, including in the claims, I mean to include alloys of aluminum.

In a preferred aspect of the invention the panels carrying the retroreflectant material, (and preferably the whole marker (other than the retroreflectant layers)) are made of aluminum. A particular advantage of aluminum in this invention is that aluminum has nearly the same coefficient of thermal expansion as the preferred retroreflectant material (polycarbonate with aluminized coating) which is preferably applied as a layer to the panel. The preferred retroreflectant material is an aluminized polycarbonate tape sold under the trademark Reflexite. Considering the fact that the reflector in accord with the invention should be designed to withstand a temperature range of −40° to +50° C., the effects of differential thermal expansion between the body of the reflector and the reflectant surface are material and in many situations the use of aluminum alloys is found the best way to avoid buckling or tearing of the retroreflectant material, since the thermal expansion coefficient of aluminum or aluminum alloys is close to that of the preferred retroreflectant material.

In a preferred aspect of the invention there is, on each panel, in addition to the retroflectant area, at least one stripe (and preferably two) of fluorescent material. The fluorescent stripe or stripes are designed to give a significant daytime indication to the pilot of the presence and (considering a number of markers collectively) of the direction of the runway. The retroreflectant material tends to give a flat impression, not easily noticeable by the pilot when illuminated by sunlight (except when the pilot is aligned with the sun and the material) or daylight.

In a preferred embodiment of the invention each of the planar panels is formed of a sheet of material, preferably aluminum, where the panel integrally extends into side walls generally perpendicular to said panels, and means are provided for joining each side wall of a panel to the adjacent side wall of the opposite panel. Preferably each panel side wall will be provided with a inwardly directed flange at its inner end generally perpendicular to the side wall and (at the desired relative angles of the panels) parallel to the flange on the side wall to which it is to be joined. Thus each flange of one side wall of one panel may simply bolted or otherwise attached to the flange of the appropriate side wall of the other panel, to produce the body of the reflector In a preferred form of the invention the planar panels in addition to converging upwardly toward each other also converge in plan from one end toward the other to provide a toed-in effect. Thus with the device mounted on the support surface in its desired attitude, horizontal planes intersect the respective panels on lines which converge relative to each other at relatively small angles, and for usual straight approaches by fixed wing aircraft, in good visibility, preferably at less than 6°. To say the same thing in different words, vertical planes through the respective panels and perpendicular thereto will usually converge at angles of 0°–6°. The result is that the toed-in markers may be arranged on each side of the runway and will give a brighter retroreflection to a pilot when he is descending along a line centered over the runway than when he is on one side or the other of such centered line. A pilot approaching the runway, on a correct line will receive a brighter reflection at points near touch down, with the toed-in markers, than with inventive markers which are not 'toed-in'.

The marker in accord with the invention should have panels with a large enough reflection area to be seen for over 2 miles in the retroreflected light from an aircraft landing light or spotlight. Each opposed panel will be substantially higher and wider than the distance between the panels to allow compactness in the panel shape. For most uses therefore the height and width dimensions will each approach or be greater than 12".

Thus 'convergence angle in plan' may be defined as the angle between vertical planes, perpendicular to the respective panels, when the marker is properly levelled. Such convergence angles in plan may also be defined as the angle between the lines where a horizontal plane intersects the respective panels.

Figure 9:
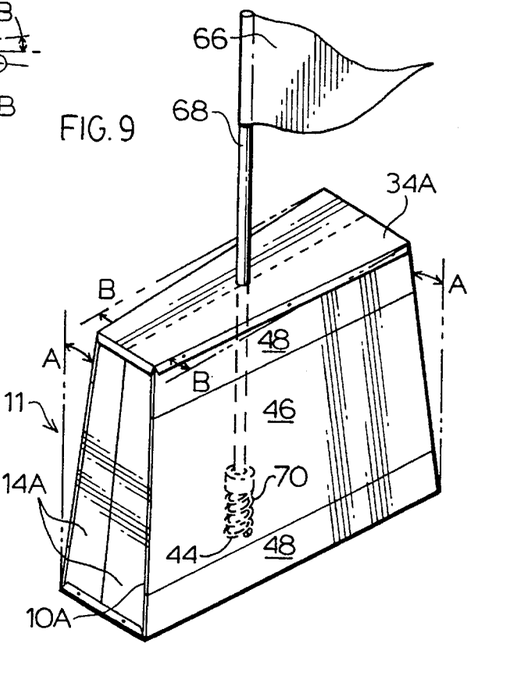
FIG. 9 shows a modified form of the inventive marker

Thus, in FIG. 9, the angle equal to 2B is the angle of convergence in plan. The angle B is often referred to as the angle of 'toe-in' as demonstrated in FIG. 10 where for each marker, the toe-in angle B measured on each side of a line perpendicular to the runway also represents, for a correctly oriented marker, in azimuth the toe-in or angle between a vertical plane, perpendicular to an individual panel and a vertical plane parallel to the runway.

In summary then, the angle 2B of convergence in plan may be considered as either the angle between vertical planes perpendicular to the opposed panels, or the angle between the lines of intersection of a horizontal plane with a horizontally mounted marker. The angle 2B may be an easier unit before the marker is mounted in place.

Figure 10:
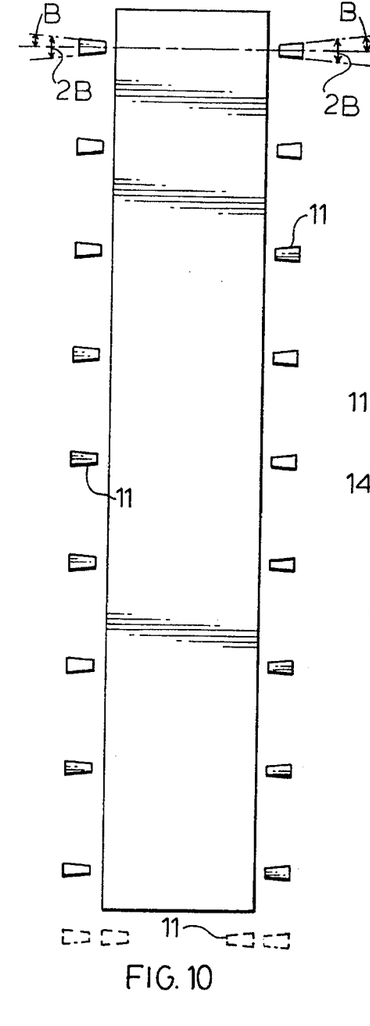
FIG. 10 shows a runway marked with the marker of FIG. 9.

When the markers are mounted, as demonstrated in FIG. 10, the vertical plane of symmetry PS is arranged perpendicular to the runway direction. The angle B then is the angle that the panels 'toe in' in each runway direction and is also the angle between a vertical plane perpendicular to the panel and a vertical plane in the runway direction D.

Figure 11:
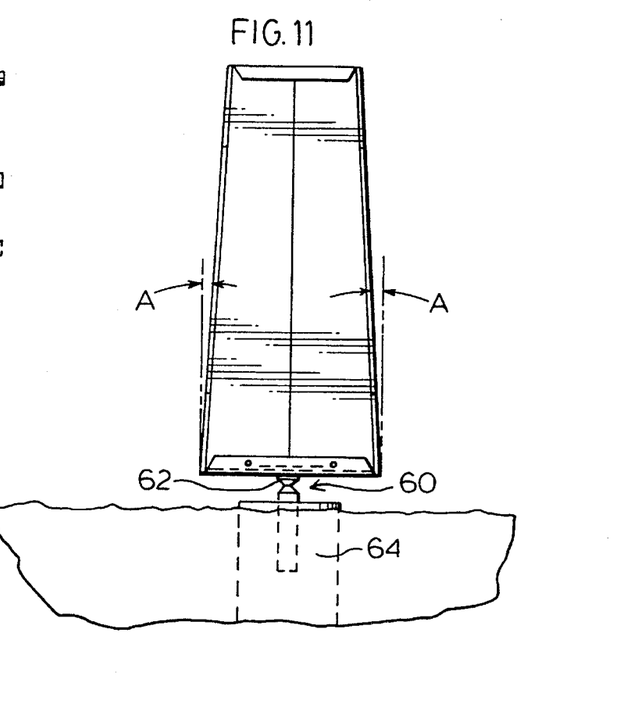
FIG. 11 shows a frangible mount for the marker.

The slope of each panel to the vertical is shown as A in FIG. 9–11.

For a normal approach path, and good visibility and a runway of 75' width (which dictates the spacing of the markers on opposite sides of the runway,) the 'acquisition point' will be over ¾ mile from a marker, at a height of about 225' when the convergence angle in plan of opposed panels is 2° and the slope of the panels to the vertical is 3°.

The 'acquisition point' is the point at which a pilot, generally aligned with the markers, is fully aware of them.

Thus given variations in aircraft landing light strength, visibility, length of approach path, it is usually desirable that the convergence angle in plan be between 0° and 6°.

However, for a number of reasons it will be desirable to have markers whose opposed panels have a greater angle of convergence in plan. Thus, in terrain requiring a very short approach path, having usually poor visibility, requiring right hand circuits which typically require a short approach, or with aircraft having weak landing lights, the angle of convergence may be greater than 6° to provide an 'acquisition point' much closer to the end of the runway than for ideal landing conditions.

The angle of convergence in plan will, further, be greater for wide than for narrow runways.

In all the angle of convergence in plan may be as high as 12°.

It is noted that, given the preferred range for convergence in plan of opposed panels, for heliports, is 16°–20°, referred to hereafter, that the overall convergence in plan range for both types of aircraft, considered collectively is for a convergence angle of the opposed panels, in plan from, over 0°–20°.

The body of the marker, thus produced, may be provided with anchoring means, and, if desired, a top member. The anchoring means may be of any design, adapted to establish attachment to the support surface and provide the correct azimuthal orientation of the marker and to provide the correct attitude, implying correct slope of the panel sides relative to the vertical. Preferably I provide a base plate with side flanges which attach to lower portions of the side walls of the joined body. The base plate may then be mounted on the support (in this case, the ground) surface beside the runway or on the runway by such means as spikes inserted into the surface or by bolting to a pre-installed base. Shims may be used with the spikes or bolts to achieve the correct attitude and, in addition, the marker must be installed in the correct azimuthal orientation.

In drawings which illustrate a preferred embodiment of the invention.

Figure 1:
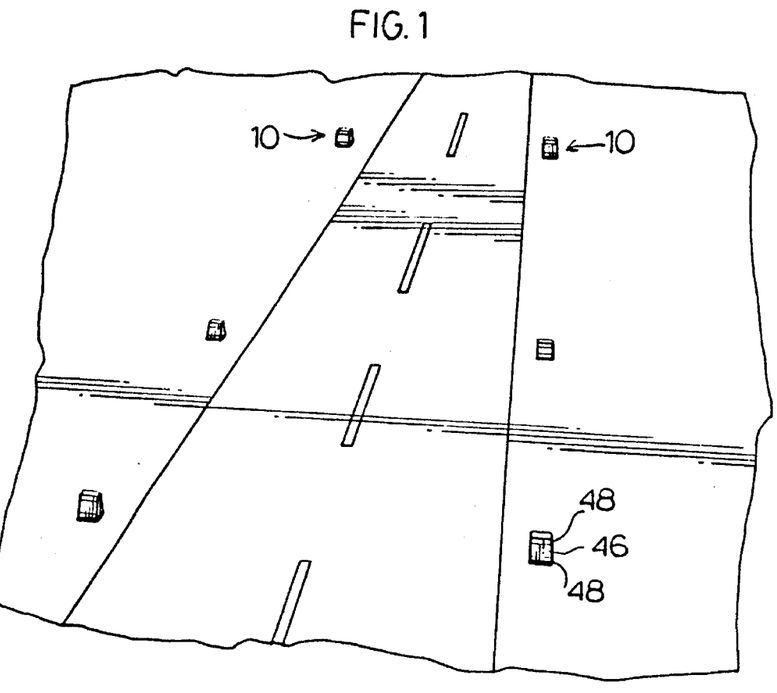
FIG. 1 shows inventive markers marking a runway.

In the preferred embodiment of the invention: FIG. 1 shows a runway for fixed wing aircraft marked with 6 markers 10 in accord with the invention, arranged three on each side of the runway in respectively spaced locations. The markers are mounted on a support surface which may be the ground itself of a specifically constructed base in its predetermined attitude both relative to the vertical and to azimuthal directions. Each marker has a pair of outwardly facing reflecting panels 12 each converging upwardly with (in correct attitude) a slope to the vertical of 2°–6° and, in azimuth, oriented so that a vertical plane parallel to the longitudinal direction of the runway is perpendicular to the planes of the reflecting surfaces of the panels. The panels 12 are preferably almost rectilinear in shape.

Each marker has two opposed planar panels 12. In the preferred construction each panel extends integrally on each side into side walls 14 preferably nearly perpendicular to the panels and extending along their height. The side walls are each provided with inwardly turned flanges 16 perpendicular to the side walls and arranged so that the flange 16 of the side wall of one panel may be parallel to and juxtaposed to the flange 16 of the appropriate side wall of the other panel. Registering bolt holes 18 are provided in the flanges so that each abutting pair of flanges may be bolted together to form the completed marker body. The panels 10 and side walls 14 are made of aluminum thick enough to be self sustaining.

Figure 3:
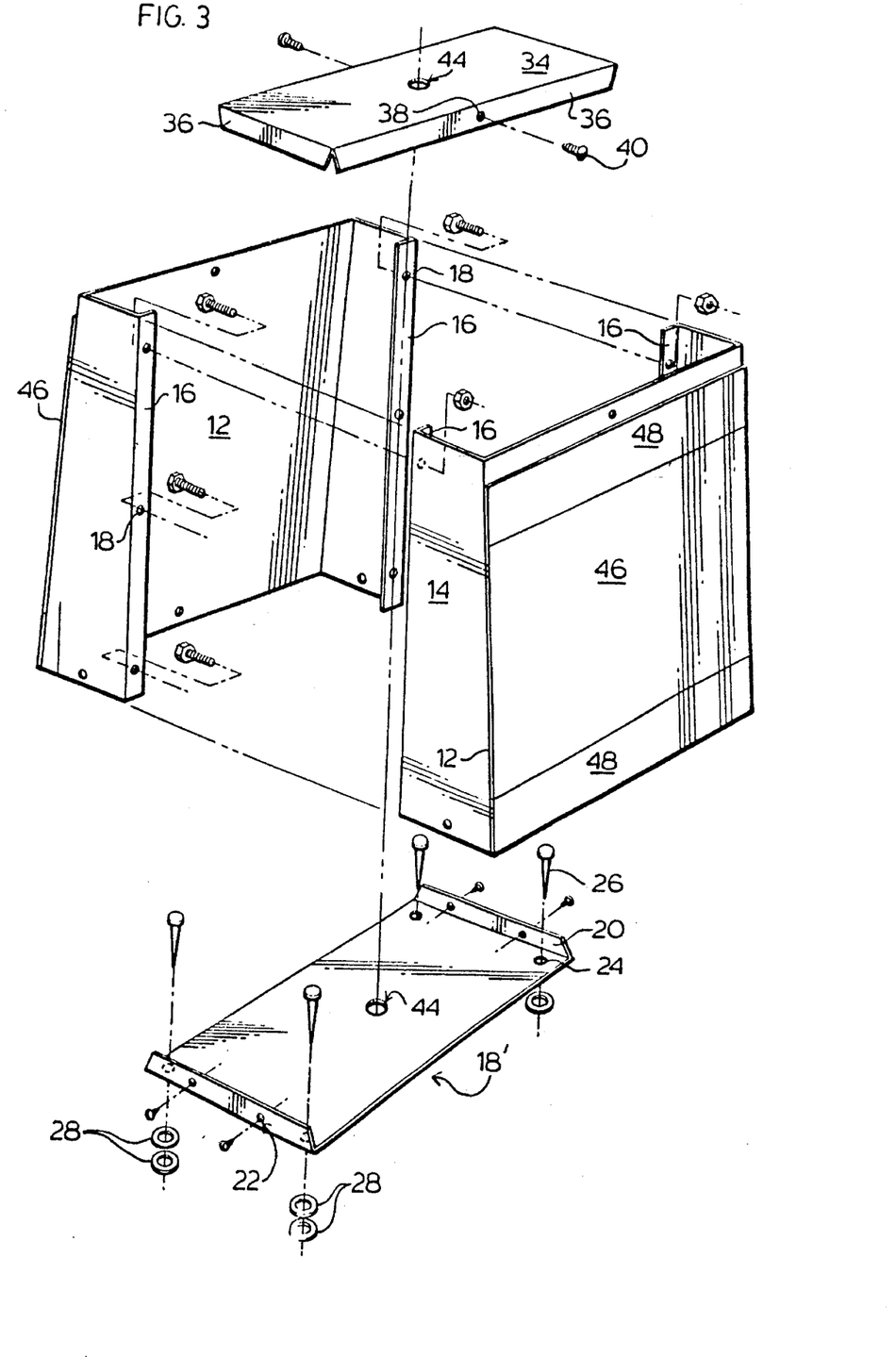
FIG. 3 shows the marker of FIG. 2 in exploded view.
Figure 5:
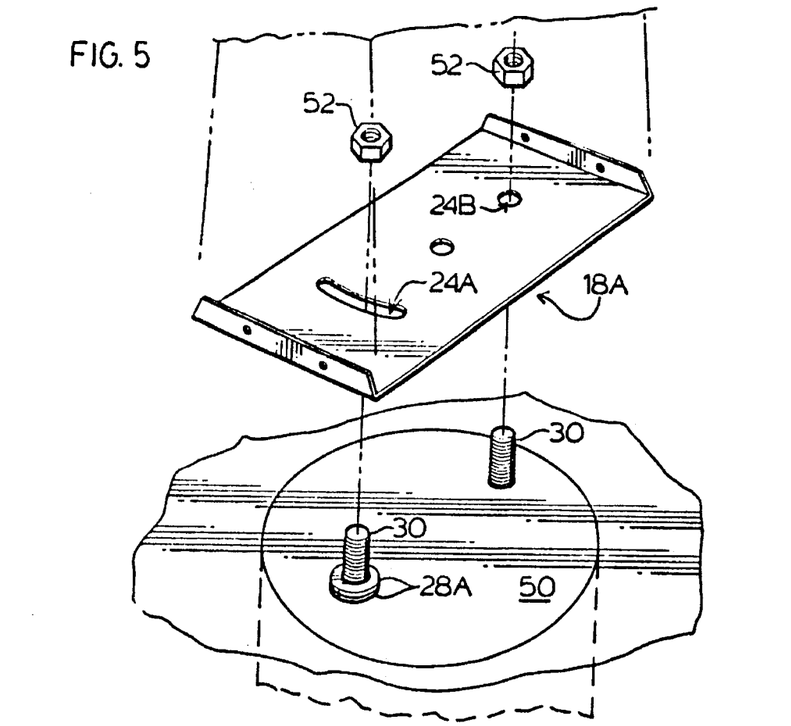
FIG. 5 shows an alternative construction for the marker base.

The body, as shown, is preferably provided with a base plate 18, for mounting the panel on a support surface. The base plate 18 is preferably made of aluminum, thick enough to be self sustaining, and dimensioned to conform to the area defined by the opposed lover edges of the panels and the opposed lower edges of respective pairs of joined side walls. The base is provided with upstanding flanges 20 at opposed edges selected to overlie the outer surfaces of the side walls for attachment thereto, preferably, where aluminum is used, by self tapping screws 22. The base plate is preferably provided with apertures 24 for anchoring means. In FIG. 3 the mode of attachment for anchoring is by spikes 26 and the support surface is the ground beside the runway. The azimuthal orientation of the marker must be selected so that vertical planes through the planar panels are aligned with the runway. The attitude of the marker to ensure the correct angle of the panels to the vertical is then adjusted by the use of appropriately selected shims 28 in the form of washers about selected spikes. In FIG. 5 the base plate is provided with a bolt hole 24B and an arcuate slot 24A about the bolt hole for receiving bolts 30 from a poured concrete base which then forms the support surface. The arcuate slot allows orientation of the marker to achieve the desired azimuthal orientation and shims 28A may be used about one of the bolts to achieve the desired attitude. The levelling of a marker in its correct attitude may however be performed by other or more sophisticated methods than those shown.

The marker may be provided with a top plate 34 having four side flanges 36 adapted to overlie the top edges of the panels 10 and side walls 14. The top plate may be attached by self tapping screws 40 through registering apertures 38 and 42.

Top plate 34 and base 18 may also be made of aluminum thick enough to sustain its shape when assembled in a marker. Top plate 34 and base 18 may each be provided with an aperture 44 (the apertures are vertically alligned) to receive the standard of a marker flag.

The top panel 10 will, over most of their area, be covered with retroreflecting material 46. I prefer to use a plastic provided with an aluminized coating defining an array of recessed cube corners. Such a retroreflecting material will, from relatively wide angles to the normal, retroreflect light from the landing lights (or searchlight) of a descending aircraft. However such retroreflector has a further quality of importance in the preferred form of the invention. The retroreflection at large angles to the normal, of the preferred recessed cube corner reflector, is relatively good but retroreflection is strongest when the incident (and hence the reflected) beam are normal to the surface. Thus the pilot, of a descending aircraft may tell when he is on the correct descent path by the fact that the retroreflection from a panel becomes brighter or less bright as he approaches or departs from the descent angle normal to the panel.

I prefer to use a cube corner recessed retroreflector formed of plastic with the cube corner recesses molded in a selectively colored aluminized reflector coating on the outer cube surface. In the preferred form of such material the recessed cube surfaces are covered with a protective transparent smooth layer (not shown) also of plastic to protect and keep clean the recessed cube.

As the retroreflectant material, I prefer to use surfaces made up of the cube reflectors as described in the following U.S. Pat. Nos.:

2,380,447 Jungerson
3,712,706 Stamm
3,684,348 Rowland
3,810,804 Rowland
4,025,159 McGrath
4,202,600 Burke The teachings of the above patents are incorporated herein by reference.

In particular the invention preferably makes use of cube corner reflective sheeting as described in the Burke U.S. Pat. No. 4,202,600 where regular arrays of cube corner reflectors in sheets are arranged in zones (indistinguishable to the user) oriented relative to adjacent zones in such a way that retroreflective intensity variation with azimuthal angle (measured in the plane of the sheet), is reduced at high angles of incidence to the normal to the sheet.

By an array is meant an ordered group of cube corner triads. A 'zone' is the area occupied by such an array.

The invention takes advantage of the fact that retroreflectant material composed of arrays of cube corner reflectors (which are not individually distinguishable at minimum expected viewing distances) customarily retroreflect incident light more strongly at a normal angle of incidence than at other angle of incidence.

It is noted that with all cube corner reflector arrays there is some directivity in the strength of the secondary reflection. That is for a given array zone the secondary reflection will be stronger in some azimuthal directions relative to the normal than others. This is of course more noticeable with a single array where all triads have an ordered orientation relative to each other. It will also be noted that the cube corner reflector array zones which are taught by U.S. Pat. No. 4,202,600 and preferred for use with the invention, are too small for resolution by he viewer so that the actual orientation of individual zones of the reflecting surface is not known when a sheet bearing the reflectant coating is applied. Thus it is preferable if the cube corner reflector sheet is divided into zones (indistinguishable at usual viewing distances) which are differently oriented relative to each other tending to give a more uniform reflection at large angles to the normal and at varying azimuthal angles about the normal.

Preferably the cube corner cavity material is that sold under the trade mark REFLEXITE, a product of the Reflexite Corporation of New Britain, Conn. Such material is a polycarbonate with an aluminized coating. In such product the cube corner cavitites are arranged in windows formed by triads of mutually perpendicular cube faces in an ordered array with a predetermined orientation. Such ordered arrays are in zones small enough to be indistinguishable to the viewer at minimum normal viewing distances. The zones are preferably arranged to have two orientations at 90° to each other arranged in a checkerboard or other pattern. The REFLEXITE material customarily is supplied in rolls with a self adherent backing.

Figure 6:
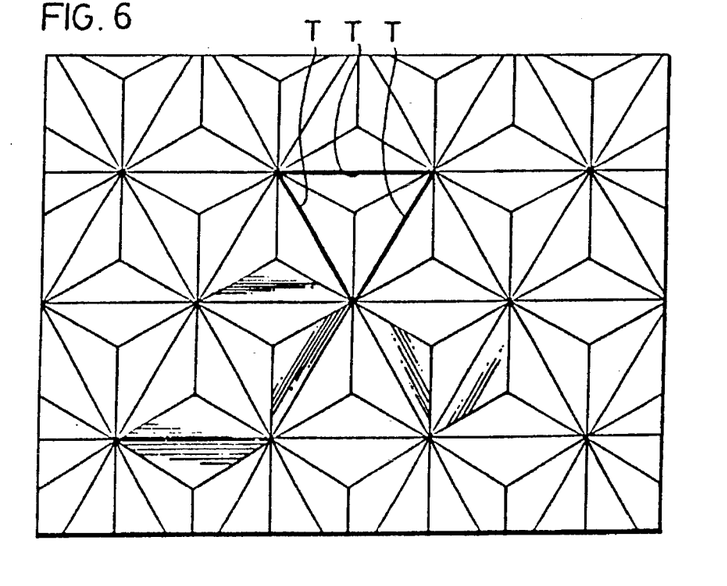
FIG. 6–8 show preferred retroreflectant material
Figure 7:
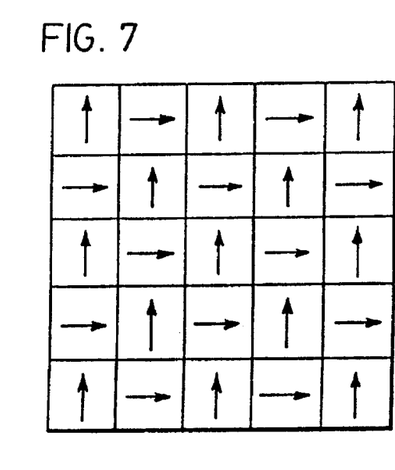
Figure 8:
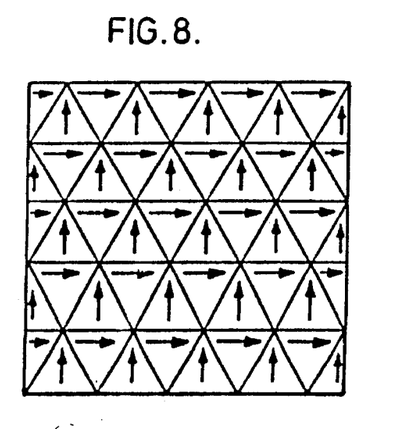

FIGS. 6–8 are taken from U.S. Pat. No. 2,202,600 previously referred to. In FIG. 6 the preferred retroreflective sheeting is schematically illustrated from the non-retroreflecting side. The array as oriented in FIG. 6 may be thought of as having an orientation corresponding to a horizontal directional arrow. As stated in U.S. Pat. No. 4,202,600 the orientation of an array with an orientation as shown in FIG. 6 can be varied in a regularly alternating pattern, such as a checkerboard pattern, in a random pattern or in any other pattern that provides sufficient mixing of different orientations to give the sheet an appearance of uniform brightness when viewed at a high angle of incidence from the minimum.

FIGS. 7 and 8 show two preferred methods of combining arrays in zones with orientations at 90° to each other. Since the arrays have 60° symmetry (90°–60°=30°) each zone has its cube corner reflectors oriented at 30° to adjacent zones. The result is reflective sheeting which for retroreflected rays at 60° to the normal, has relatively even reflectivity at different azimuthal angles about the normal.

As previously stated the preferred sheeting of the Reflexite Corporation of New Britain Conn. The zones are indistinguishable at normal minimum viewing distance.

It is noted that the two qualities of the preferred material which are of principal value with this invention, are that the night retroreflection at relatively wide angles to the normal to the plane allows the pilot, at night, to find the general location of the runway and its markers, while the stronger retroreflection when the pilot is on his correct descent path acts as an indicator to help him to reach and maintain the correct descent path.

The preferred retroreflecting material is customarily supplied in rolls, from which the may be cut for adhesive application to panels 10 to form, as shaped by the planar panels, a substantial planar retroreflecting area 46. Such area will be principally used at night and I prefer to use retroreflecting material of silver color.

Since the marker should be designed to operate over a temperature range of −50° to 40° C., it is of some importance that the thermal expansion coefficient of the retroreflectant layer be close to that of the panels 10. With the preferred retroreflecting material as described above the planar panel is preferably made of aluminum since its coefficient of thermal expansion is sufficiently close to that of the preferred "Reflexite" (an aluminized polycarbonate tape) as to prevent, in most circumstances, the buckling or tearing of the "Reflexite" over the above temperature range.

In this embodiment it is preferred to make the marker other than the reflecting layer or layers of aluminum sheet of sufficient thickness to sustain its shape and cut and bent to form panels 10, side walls 14 and flanges 16 as described.

Although the retroreflectant material works excellently at night when illuminated by the searchlight or landing light of an aircraft, such material is difficult to distinguish in sunlight or ambient daylight which, of course, is not normally retroreflected to the pilot. Accordingly, it is preferred to provide at least one and preferably upper and lower stripes 48 of fluorescent material, above and below each area 10 and oriented to be horizontal in the preferred attitude of the marker. Such bars are preferably formed of self-adhesive fluorescent tape of color contrasting with that of area 46 (fluorescent orange is preferred for stripes 48) and overlying each panel 10 above and below each area 46 (as shown) and alternatively the material forming area 46 may be cut to cover the whole area of panel 10, and the upper and lower fluorescent stripes 48 placed thereover.

There is thus provided, for daytime use, the marker with two horizontal stripes 48 which assist the pilot in locating the runway, and its azimuthal orientation, and to indicate the horizontal inclination in directions transverse to the runway. The bars 48 of course do not strongly retroreflect nor do they give the pilot an indication of whether he is descending at the correct angle. They are however useful in the daytime when the retroreflectant material looks dull under solar or ambient light illumination.

The area of the retroreflecting portion of each panel is designed to be visible for over 2 miles in the retroreflected light from an aircraft landing light or spotlight. Thus each opposed panel will define a retroreflectant area that is higher and wider than the distance between the panels, since the distance between the panels will be minimized to reduce overall marker size. For most panels of rectilinear or near rectilinear shape the height and width dimension of the retroreflecting portion will each approach or be greater than 12".

Figure 4:
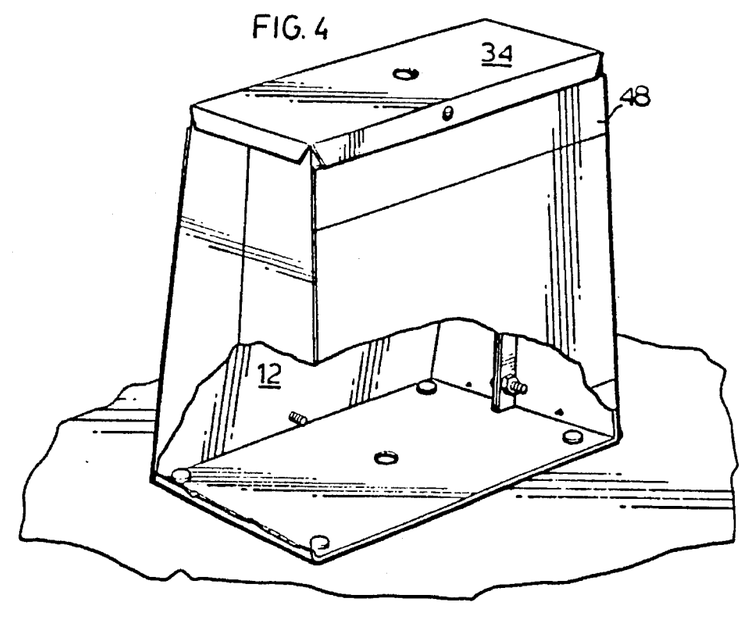
FIG. 4 shows a broken-away view of an assembled marker

The embodiment of FIG. 5 shows a poured concrete base 50 which would be located beside the runway and which has a pair of upstanding bolts 30. The base 18A is rotated about the bolt through hole 24B until the correct azimuthal orientation is obtained, and then the nuts 52 are tightened to fix the tray firmly in place. The marker is then installed on the tray as described in connection with FIGS. 3 and 4.

It should be said that any method of anchoring to a support surface and levelling the marker thereon is within the scope of the invention.

The preferred embodiment has been described with angular slope of the panels 10 suitable for fixed wing aircraft. This is believed to be the principal use of the invention.

Figure 2:
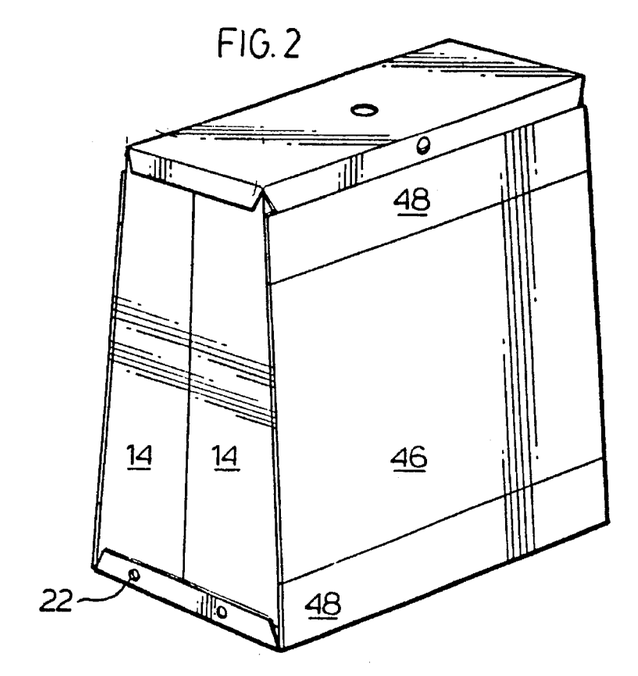
FIG. 2 shows an assembled marker.

FIGS. 9–11 show a form 11 of the marker which is a modified alternative to that shown in FIG. 2. FIG. 9 shows that the members 10A, 14A, 34A (corresponding in function to members 10, 14 and 34 are so proportioned that opposite faces of the planar panel slope toward each other at an angle A to the vertical as with the panel of FIG. 2. This for FIGS. 9, 10 (or FIG. 2) the angle A is 2°–6° for fixed wing aircraft and 8°–10° for helicopters.

FIGS. 9 and 10 further show that it is preferred to have the planar panels "toed-in" toward each other by the angle B (making the angle of convergence 2B). For many applications with fixed wing aircraft B will equal about 1°. Although such convergence is best shown only at the top of the marker, the planar panels are arranged so that they converge at substantially the same angle in any horizontal section through the marker. FIG. 10 shows, in plan, a plurality of the markers of FIG. 9. The advantage of the toed-in arrangement will be obvious from FIG. 10. Thus, as shown, the toe-in is achieved by orienting the planar panels so that the vertical planes perpendicular to the panels preferably intersect at an angle of greater than 0° and less than 6° (that is 2B is between 0° and 6°). Thus, as shown, the toed-in markers are arranged so that their axis of symmetry of the marker is perpendicular to the runway (FIG. 10) and will tend to self retro-reflect from each side of the runway toward an aircraft approaching along the center of the runway axis, when on a regular flight path more clearly than would markers as in FIG. 2 where vertical planes, normal to the planar panels are parallel to each other.

As noted in the introduction the preferred convergence (2B) in place is 2° (so that a marker in place has a "toe-in" of 1° in each direction) and with each panel having a vertical slope of 3°, the acquisition point, when approaching the runway from either direction will be about ¾ mile at a height of about 200'.

As further noted in the introduction, although, for many purposes, the range of 0°–6° will be suitable for convergence angle in place, many factors come into play and for some uses will require a greater angle (2B) for convergence in place. Thus, given the suggested ¾ mile acquisition point, a wider runway (or marker spacing for other reasons) a larger convergence angle will be required.

As also noted in the introduction under some conditions a closer acquisition point is required, hence a greater convergence angle in plan is required. Such conditions include, but are not limited to, a short approach path due to rough terrain, obstructions, frequent frequent requirement for right handed circuits, frequent poor visibility or frequent use of low power landing lights may require convergence angles in plan (2B) for up to 12°.

Thus in the alternative of FIGS. 9 and 10 the toed-in planar panels 10A may be provided with central retroreflecting layers 46 bordered by upper and lower fluorescent stripes 48 as in the embodiment of FIGS. 2 and 3.

FIG. 9 also illustrates the provision of a marker pennant 66 on a standard 68 which passes through upper aperture 44 to seat on a spring 70 which rests in lower aperture 44.

FIG. 11 demonstrates that the reflecting marker constructed as described in relation to either FIG. 2 or FIG. 9 may be mounted on a frangible standard 60 of plastic which is molded to provide an easily frangible narrowing 62. The Frangible standard is mounted in a base 64 in any conventional manner while the base may be embedded in the ground beside a runway or may be free standing. The provision of the frangible mount means that, if a marker is struck by an errant aircraft, it may break off with less damage to the aircraft than would a fixed marker.

The various embodiments show retroreflecting material 46 on the two sloping sides 10 bordered by upper and lower fluorescent strips 48.

FIG. 10 indicates, in dotted form, that markers 11 may be arrayed across each end of the runway, to indicate the runway limits.

It is noted that the invention may also be used to mark helicopter pads and launching areas. For use with helicopters, the panels 10, in their correct attitude, and their retroreflective material should converge in plan at 16°–20° (see angle 2B FIG. 10 and the two angles B, FIG. 9;) and, in the correct marker attitude, slope at 8°–10° to the vertical, see angle A, FIGS. 9 and 11, corresponding to the desired helicopter descent angle. The panels will, in use, be oriented to be perpendicular to a vertical plane extending in the desired viewing direction for a pilot at the acquisition point.

Thus considering collectively the markers for fixed wing aircraft and the markers for helicopters the convergence angle of the opposed panels, in plan (angle 2B, FIGS. 9 and 10) may range from 0°–20°.

I claim:

1. A marker designed to be mounted on a support surface, means for mounting said marker on said support surface in a predetermined attitude said marker, when so mounted, comprising a pair of panels facing approximately away from each other in azimuthal directions, said panels sloping upwardly toward each other at an angle of between 2° and 10° to the vertical, and having retroreflectant material covering a substantial area of said panels, wherein said marker is shaped so that, when mounted in said attitude, vertical planes through said panels, and perpendicular thereto, intersect at more than 0° and less than 20° to each other.

2. A marker as claimed in claim 1 wherein said vertical planes intersect at more than 0° and less than 12° and said panels slope toward each other at an angle of between 2° and 6° to the vertical.

3. A marker as claimed in claim 2 wherein said vertical planes intersect at about 2°.

4. A marker as claimed in claim 3 wherein the retroreflectant material is an aluminized polycarbonate tape and said panels are formed of aluminum.

5. A marker as claimed in claim 2 wherein the retroreflectant material is an aluminized polycarbonate tape and said panels are formed of aluminum.

6. A marker as claimed in claim 1 wherein said vertical planes intersect at an angle from 12° to 16° and said panels slope toward each other at an angle of 8°–10° to the vertical.

7. A marker as claimed in claim 6 wherein the retroreflectant material is an aluminized polycarbonate tape and said panels are formed of aluminum.

8. A marker as claimed in claim 1 wherein the retroreflectant material is an aluminized polycarbonate tape and said panels are formed of aluminum.

9. An aircraft marker suitable for location on a support surface, means for mounting said marker on said support surface in a predetermined attitude, said marker, when so mounted, comprising a pair of panels facing approximately away from each other, in azimuthal directions, said panels sloping upwardly at an angle of between 2° and 10° to a vertical, and having retroreflectant material covering a substantial area of said panels, the area of said retroreflectant material on each panel being sufficient to be visible to a pilot on an approach path, wherein each of said panels has sufficient area to be visible to a pilot ¾ of a mile away on an approach path.

10. The marker as claimed in claim 9 wherein the panels slope upwardly toward each other at an angle of between 2° and 6° to the vertical.

11. A marker as claimed in claim 10 wherein the retroreflectant material is an aluminized polycarbonate tape and said panels are formed of aluminum.

12. The marker as claimed in claim 9 wherein the panels slope upwardly toward each other at an angle of between 8° and 10° to the vertical.

13. An aircraft marker suitable for location on a support surface, means for mounting said marker on said support surface in a predetermined attitude, said marker, when so mounted, comprising a pair of panels facing approximately away from each other, in azimuthal directions, said panels sloping upwardly at an angle of between 2° and 10° to a vertical, and having retroreflectant material covering a substantial area of said panels, the area of said retroreflectant material on each panel being sufficient to be visible to a pilot on an approach path, wherein the retroreflectant material is an aluminized polycarbonate tape and said panels are formed of aluminum.

* * * * *